(12) United States Patent
Morris et al.

(10) Patent No.: US 6,311,140 B1
(45) Date of Patent: Oct. 30, 2001

(54) METHOD AND APPARATUS FOR SERVO DATA SYNCHRONIZATION IN A DISC DRIVE

(75) Inventors: John C. Morris; Dustin M. Cvancara, both of Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/723,358

(22) Filed: Nov. 27, 2000

Related U.S. Application Data (62) Division of application No. 09/488,377, filed on Jan. 20, 2000.
(60) Provisional application No. 60/117,153, filed on Jan. 25, 1999.

(51) Int. Cl.[7] ............................................. G01P 15/08
(52) U.S. Cl. ..................... 702/141; 73/514.16; 318/649
(58) Field of Search ........................ 702/141, 142, 702/127, 1, 183, 145, 150, 189; 73/488, 491, 493, 494, 504.03, 504.02, 514.16; 324/160, 162; 318/649–651; 360/49, 130.32, 244.1, 245.8, 245.9; 369/33, 34; 708/854; 700/46, 94, 304

(56) References Cited

U.S. PATENT DOCUMENTS

| | | | |
|---|---|---|---|
| 5,111,417 | | 5/1992 | Belloc et al. ................. 364/724.1 |
| 5,255,136 | | 10/1993 | Machado et al. ................. 360/77.02 |
| 5,325,247 | | 6/1994 | Ehrlich et al. ................. 360/78.09 |
| 5,331,346 | | 7/1994 | Shields et al. ................. 348/441 |
| 5,440,939 | * | 8/1995 | Barny et al. ................. 73/862.61 |
| 5,481,568 | | 1/1996 | Yada ................. 375/340 |
| 5,512,895 | | 4/1996 | Madden et al. ................. 341/61 |
| 5,646,797 | | 7/1997 | Kadlec et al. ................. 360/75 |
| 5,663,847 | | 9/1997 | Abramovitch ................. 360/77.02 |
| 5,675,450 | | 10/1997 | Kadlec ................. 360/78.09 |
| 5,786,778 | | 7/1998 | Adams et al. ................. 341/61 |
| 5,825,657 | | 10/1998 | Hernandez ................. 364/486 |
| 5,844,514 | | 12/1998 | Ringh et al. ................. 341/143 |
| 5,892,694 | | 4/1999 | Ott ................. 364/724.1 |
| 5,914,520 | * | 6/1999 | Werner ................. 257/415 |
| 5,986,845 | | 11/1999 | Yamaguchi et al. ................. 360/75 |
| 6,130,464 | * | 10/2000 | Carr ................. 257/417 |
| 6,167,757 | * | 1/2001 | Yazdi et al. ................. 73/514.32 |
| 6,216,537 | * | 4/2001 | Henschel et al. ................. 73/493 |
| 6,249,754 | * | 6/2001 | Neul et al. ................. 702/145 |

FOREIGN PATENT DOCUMENTS

| | | |
|---|---|---|
| 60136972 | 7/1985 | (JP). |
| 0 233 314 | 8/1987 | (WO). |
| WO 92/05543 | 4/1992 | (WO). |

\* cited by examiner

Primary Examiner—Marc S. Hoff
Assistant Examiner—Edward Raymond
(74) Attorney, Agent, or Firm—Theodore M. Magee; Westman, Champlin & Kelly, P.A.

(57) ABSTRACT

A sensor chip is provided that includes a sensing element and a sigma-delta circuit that cooperate to generate sensor samples at a sensor data rate and a buffer that stores sensor samples at the sensor data rate. Although the buffer stores the samples at the sensor data rate, it is capable of providing the samples to an external circuit at a higher data rate. In one embodiment, the sensor chip is able to provide the stored sensor samples to an off-chip component at a rate set by the off-chip component.

9 Claims, 7 Drawing Sheets

METHOD AND APPARATUS FOR SERVO DATA SYNCHRONIZATION IN A DISC DRIVE

REFERENCE TO RELATED APPLICATIONS

The present application is a Divisional of and claims priority from U.S. patent application Ser. No. 09/488,377, filed on Jan. 20, 2000, and entitled METHOD AND APPARATUS FOR SERVO DATA SYNCHRONIZATION IN A DISC DRIVE, which claims priority from a U.S. Provisional Patent Application having serial No. 60/117,153 filed on Jan. 25, 1999 and entitled RESAMPLING A NOISY SIGNAL.

FIELD OF THE INVENTION

The present invention is related to disc drives. In particular, the present invention is related to servo systems.

BACKGROUND OF THE INVENTION

In a computer disc drive, data is stored on a computer disc in concentric tracks. In disc drives with relatively high track densities, a servo feedback loop is used to maintain a head over the desired track during read or write operations. This is accomplished utilizing prerecorded servo information either on a dedicated servo disc or on angularly spaced sectors that are interspersed among the data on a disc, During track following, the servo information sensed by the head is demodulated to generate a position error signal (PES), which provides an indication of the position error of the head away from the track center. The PES is then converted into an actuator control signal, which is fed back to control an actuator that positions the head.

As the areal density of magnetic disc drives increases, so does the need for more precise position control when track following, especially in the presence of external shock and vibrations. In order to desensitize disc drives to translational vibrations, a balanced mechanical actuator has been typically used. However, since the actuator must pivot freely to access the data, the effects of rotational vibration about the axis parallel to the pivot axis can be considerable.

To eliminate such errors, a disc drive may introduce cancellation signals into the servo loop that are designed to cancel the vibration-induced runout. To generate an appropriate cancellation signal, the disc drive must accurately measure the vibration of the disc drive using an internal accelerometer.

Since the positioning of the head requires a great deal of accuracy, it is preferred that the sensors be as accurate as possible. In addition, since space within the disc drive is limited, it is preferred that the sensor be as small as possible so that it does not take up valuable printed circuit board space. One type of sensor that is small and accurate is known as a Micro Electro-Mechanical System (MEMS). However, these sensors generate data at a rate that is incompatible with the lower data rate of the servo loop. Moreover, the rate at which these sensors produce data is generally fixed because the data rate is a by-product of the sensing characteristics of the sensor. Thus, the data rate of a MEMS sensor cannot be changed much once the other performance characteristics of the sensor have been chosen. As such, a sensor is needed that can be used with a servo system to generate a cancellation signal while providing the size and accuracy benefits of a MEMS sensor.

SUMMARY OF THE INVENTION

A sensor chip is also provided that includes a sensing element and a sigma-delta circuit that cooperate to generate sensor samples at a sensor data rate. The sensor chip also includes a buffer that is connected to the sigma-delta circuit and that is capable of storing sensor samples from the sigma-delta circuit at the sensor data rate. The buffer is also able to provide stored sensor samples at a rate that is higher than the sensor data rate. In one embodiment, the sensor chip is able to provide the stored sensor samples to an off-chip component at a rate set by the off-chip component.

DETAILED DESCRIPTION OF ILLUSTRATIVE EMBODIMENTS

Figure 1:
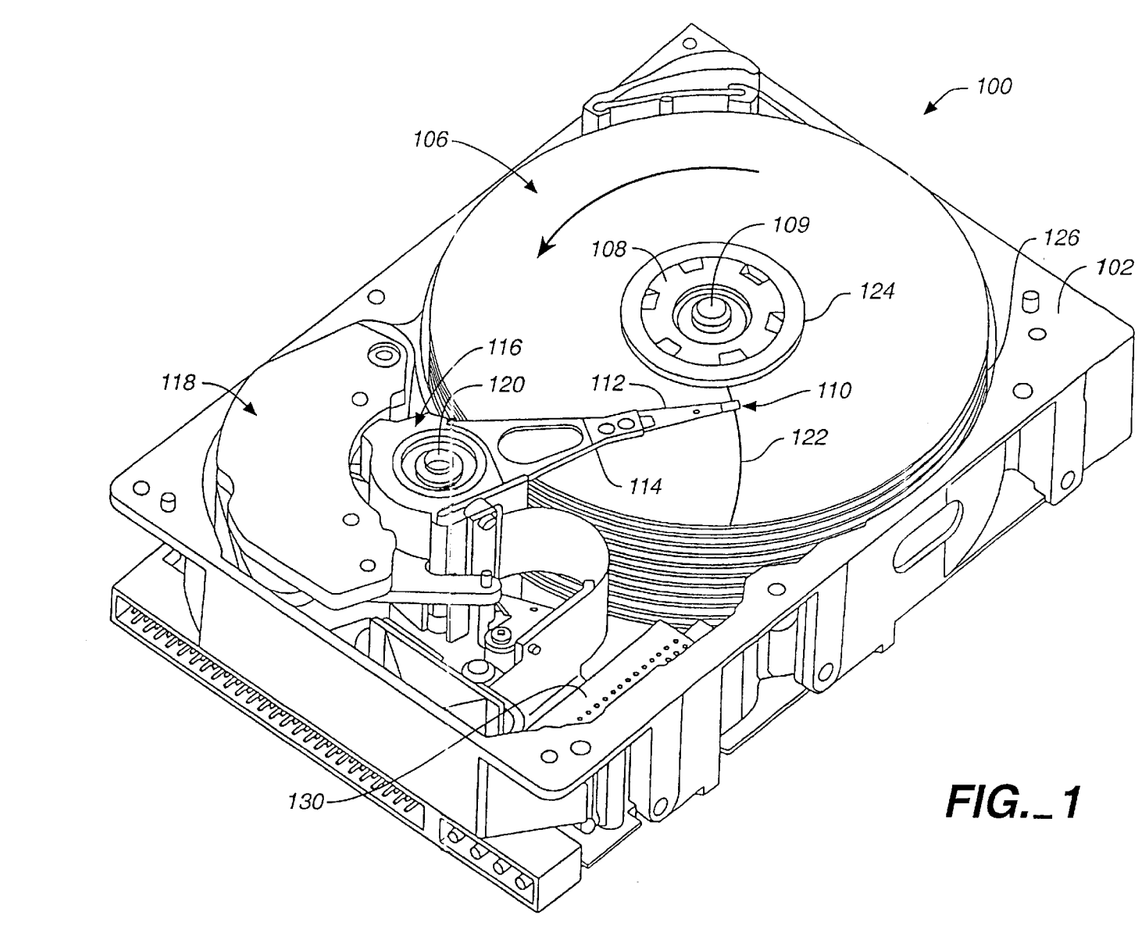
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
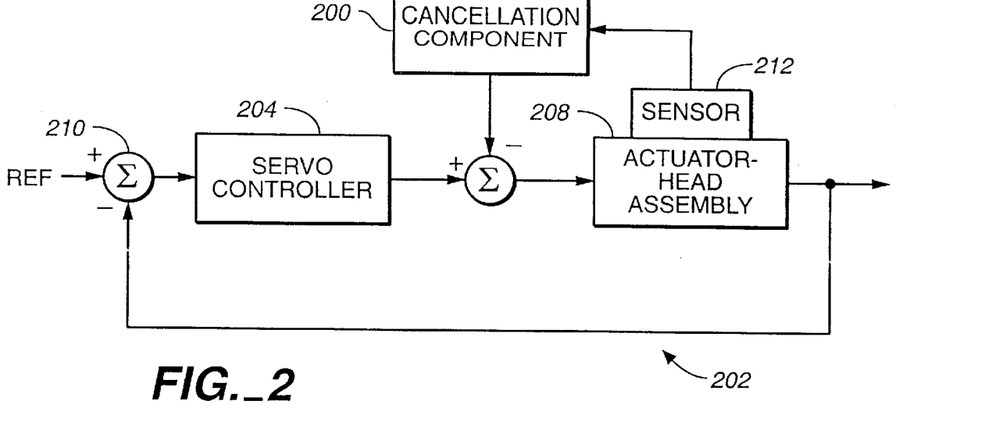
FIG. 2 is a block diagram of a servo loop with a cancellation system of the present invention.

FIG. 2 is a block diagram of a servo loop 202 that is found in servo electronics 130 of the present invention. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a summing node 210 that receives a reference signal (REF) indicating the desired position for a head on the disc. Summing node 210 combines the reference signal with a position value, described below, to produce a position error signal that is provided to a digital controller 204. Based on the position error signal, digital controller 204 generates a digital control value that is provided to a cancellation summing node 206.

Cancellation summing node 206 also receives a cancellation value from a cancellation component 202 and subtracts the cancellation value from the digital control value to produce a modified control value. The modified control value is provided to an actuator-head assembly 208 and causes actuator-head assembly 208 to change the position of the heads relative to tracks on the disc.

Using servo patterns stored on the disc, a head in actuator-head assembly 208 generates an analog signal that indicates the distance from the head to the track center. The analog signal is converted into a digital signal within assembly 208 and the digital signal is fed back to summing node 210. Summing node 210 then subtracts the digital signal from the reference signal to produce the position error signal (PES) that is provided to controller 204.

While the actuator-head assembly is moving the head across the disc surface, a sensor 212 mounted on the printed circuit board assembly generates sensor data corresponding to vibrations of the disc drive. This sensor data is provided to a cancellation control component 200, which generates the cancellation value provided to summing node 206 based on the detected vibration of the disc drive. In most embodiments, the cancellation value is designed to remove position errors that would otherwise be generated by the vibrations.

Note that in order for the cancellation value to be subtracted from the control value in summing node 206, the cancellation values and the control values must be produced at the same data rate. In general, this data rate is the rate at which servo sectors on the disc pass by the head and is referred to as the servo data rate. However, as discussed in the background section, sensor 212 generally produces data at a different rate than this servo data rate. Therefore, some form of data rate conversion is needed before the sensor data can be converted into cancellation data.

Under the present invention, this conversion is performed by expanding and then decimating the sensor signal to produce a sensor signal at the servo data rate. Specifically, the present invention generates an expanded data signal with a data rate that is a factor of L faster than the sensor data rate. The invention then filters the expanded signal to produce a filtered signal that is decimated by selecting each Mth sample from the filtered signal to produce a sensor signal at the servo rate. The relationship between the sensor data rate, $f_s$, and the servo data rate, $f_o$, is thus described as:

$$f_o = \frac{L}{M} f_s \qquad \text{EQ. 1}$$

Figure 3:
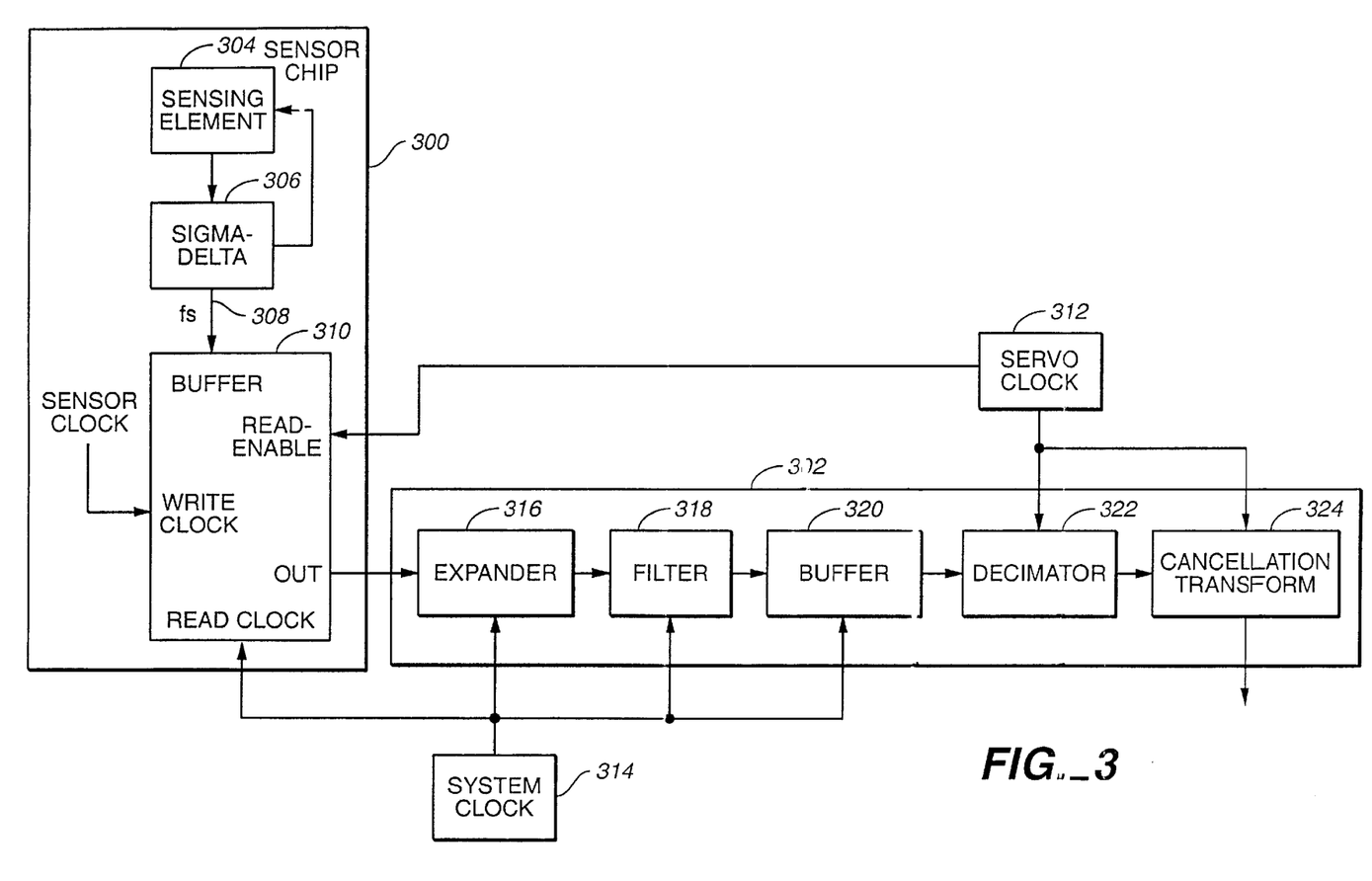
FIG. 3 is a more detailed block diagram of the sensor and cancellation component of FIG. 2.

FIG. 3 is a block diagram of one embodiment of a sensor chip 300 and a cancellation component 302 of the present invention that transform a sensor data signal at the sensor data rate into sensor data at the servo data rate. Sensor chip 300 includes a sensing element 304 and a sigma-delta circuit 306 that cooperate to form a sensor signal 308. In some embodiments of the invention, sensing element 304 is a Micro-Electromechanical System (MEMS) that senses acceleration.

Sensor signal 308 is produced at a rate $f_s$, and is stored in a buffer 310 at that rate. Buffer 310 is an asynchronous buffer that allows data to be stored at one rate and read at a different rate. The rate at which data is stored is controlled by a write-clock input and the rate at which data is read from the buffer is controlled by a read-clock input. In most embodiments, buffer 310 is located within sensor chip 300 so that it has a direct connection to a sensor clock based on the sensor data rate $f_s$. However, in other embodiments, buffer 310 is external to sensor chip 300. To accommodate all of the data, buffer 310 must have at least floor(M/L)+1 elements, where L is the expansion factor and M is the decimation factor as found in Equation 1 above.

Figure 4:
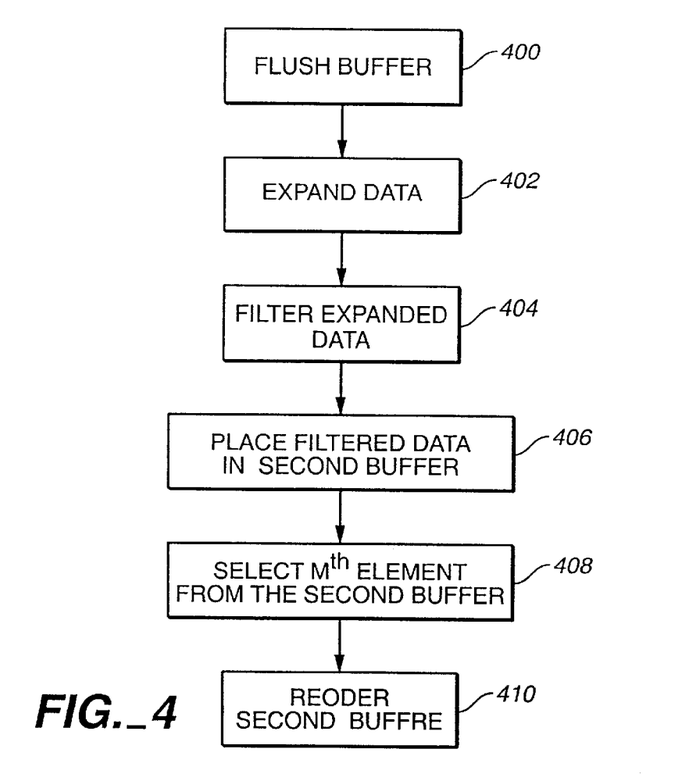
FIG. 4 is a flow diagram of one method of the present invention for converting sensor data into converted data at the servo rate.

FIG. 4 is a flow diagram of a process for converting the data stored in buffer 310 into a cancellation data signal that has a data rate equal to the servo data rate. The process of FIG. 4 begins at step 400 where buffer 310 is flushed once per servo period. In the embodiment of FIG. 3, this is accomplished by applying externally generated signals to buffer 310's read-clock input and read-enable input, which control how fast data is read from the buffer and when data is read from the buffer, respectively. In FIG. 3, the read-clock input is connected to a high-speed clock such as system clock 314 that typically operates at a much higher frequency than the sensor data rate $f_s$. Buffer 310's read-enable input is connected to a servo clock 312 that operates at the servo loop data rate. When servo clock 312 transitions from low to high, the contents of buffer 310 are read out at the data rate of system clock 314. Thus, system clock 314 and servo clock 312 cause the contents of buffer 310 to be flushed once per servo period at a high data rate. Under most embodiments, this flushing will produce at most floor(M/L)+1 elements.

Figure 5:
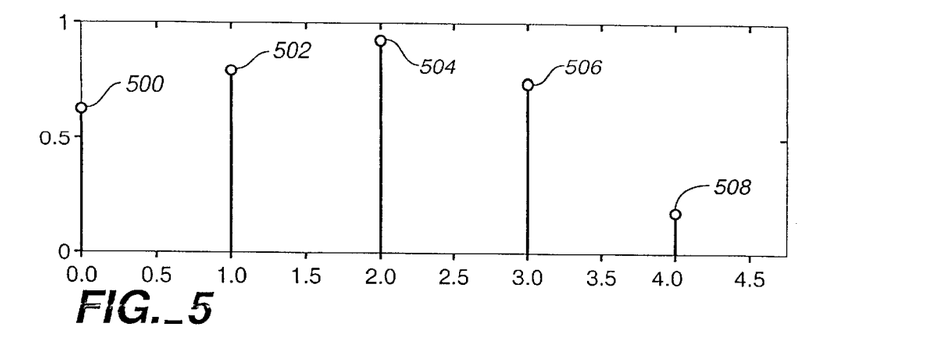
FIG. 5 is a graph of sensor samples at a sensor data rate.
Figure 6:
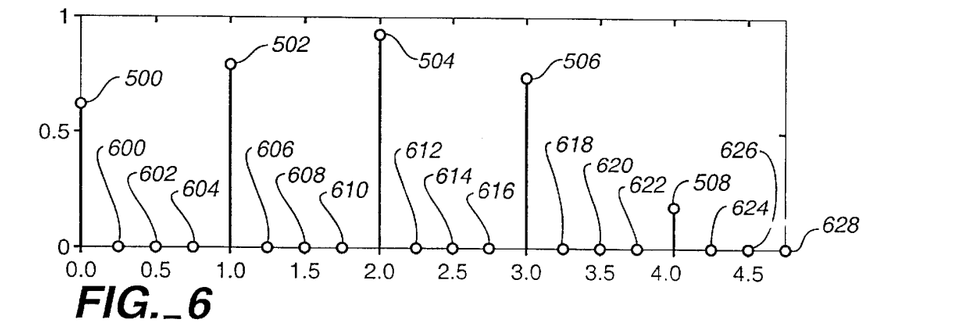
FIG. 6 is a graph of enlarged sensor samples.

The data flushed from buffer 310 is provided to an expander 316 in cancellation component 302. Expander 316 also receives a clocking signal from system clock 314 and operates at a multiple of the system clock frequency. As shown in step 402 of FIG. 4, expander 316 expands the data samples from buffer 310 by inserting additional zero-value data samples between the samples from buffer 310. This expansion can be seen in FIGS. 5 and 6, which show graphs of the data from buffer 310 and expander 316, respectively, as a function of time. In FIG. 5, five data samples 500, 502, 504, 506 and 508 are shown. In FIG. 6, expander 316 has inserted data samples 600, 602, 604, 606, 608, 610, 612, 614, 616, 618, 620, 622, 624, 626, and 628 between the data samples from buffer 310. Specifically, expander 316 has inserted three zero-value data samples is between each of the data samples from buffer 310.

By inserting the additional data samples, expander 316 effectively increases the data rate. Specifically, by inserting L−1 data samples between each sample from buffer 310, expander 316 increases the data rate to L times the sensor data rate $f_s$. Thus, in the example of FIGS. 5 and 6, expander 316 increases the data rate to $4f_s$. The expansion results in M+L expanded samples for the current servo period.

Figure 7:
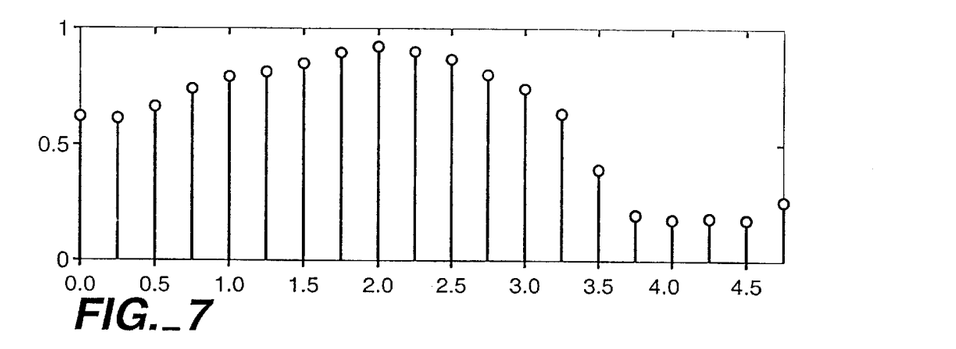
FIG. 7 is a graph of filtered sensor samples.

After the buffer data is expanded, the expanded data is filtered at step 404 of FIG. 4. In most embodiments, the filtering is performed by a low pass filter 318 that smoothes the samples in the expanded signal. The effects of this smoothing can be seen in FIG. 7, which shows the result of filtering the expanded signal of FIG. 6. In most embodiments, the low pass filter is selected so that its cutoff frequency is less than one-half the servo data rate. By selecting this cut-off frequency, the filter is able to remove high frequency noise in the sensor data that would otherwise be reflected into the cancellation data when the filtered data is decimated as described below. Such high frequency noise is especially acute in sensors that use sigma-delta circuits since these circuits tend to force noise into the upper frequency bands. Thus, filter 318 smoothes the data samples in the expanded data signal while at the same time removing high frequency noise.

Figure 8:
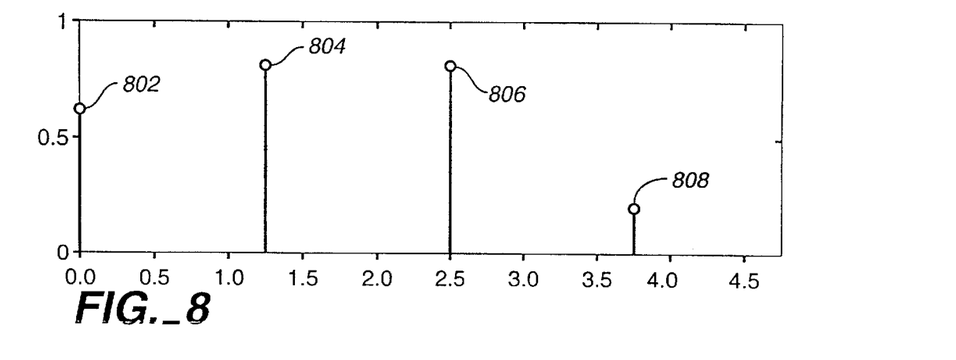
FIG. 8 is a graph of decimated sensor samples at the servo rate.

At step 406 of FIG. 4, the filtered data is stored in a second buffer 320 of FIG. 3. Within second buffer 320, the data is organized from oldest data to newest data. At step 408 of FIG. 4, the Mth sample from the buffer is selected by a decimator 322 as the sensor sample for the current servo period, resulting in a decimation of the filtered signal by a factor of M. This decimation can be seen in FIG. 8, which shows sensor data at the servo rate after decimation of the filtered samples of FIG. 7. In particular, FIG. 8 shows a decimation by a factor of 5 (M=5) resulting in sensor data samples 802, 804, 806, and 808 at a servo data rate, $f_0$, that is equal to $\frac{1}{5}$ (L/M) of the sensor data rate $f_s$. In most embodiments, decimator 322 operates in part based on servo clock 312 so that the output of decimator 322 is synchronized with the servo data in the remainder of the servo loop.

At step 410 of FIG. 4, decimator 322 reorders buffer 320 by shifting all of the samples upward M positions in the buffer and discarding the samples that surpass the top address of the buffer.

The output from decimator 322 is provided to a cancellation transform component 324, which uses the sensor data to generate a cancellation signal. This cancellation signal is then provided to summing node 206 in synch with the servo control value from servo controller 204.

Figure 9:
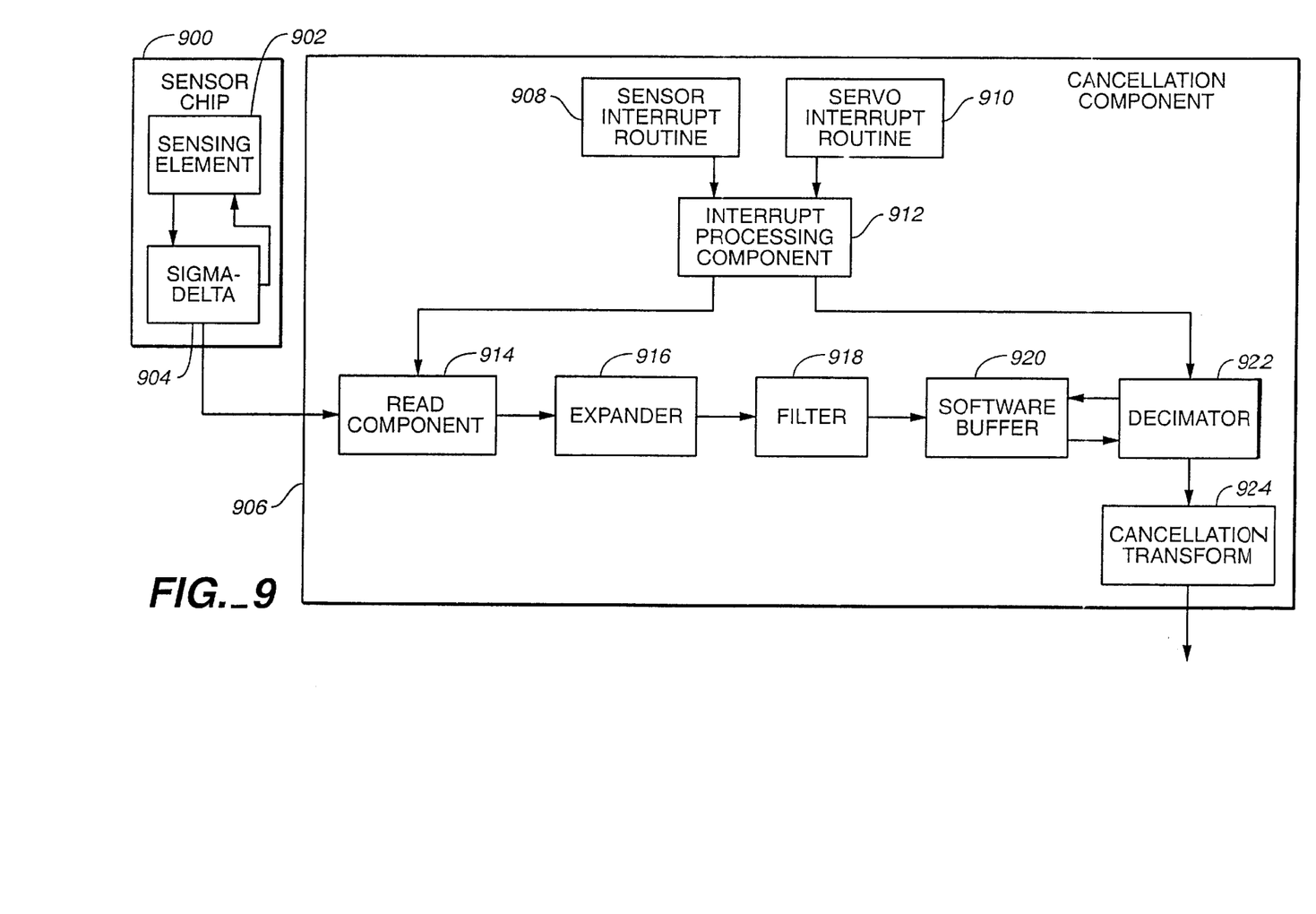
FIG. 9 is a block diagram of an alternative embodiment of the sensor and cancellation component of FIG. 2.

FIG. 9 is a block diagram of an alternative embodiment of the present invention, in which a buffer is not needed in the sensor chip. Thus, sensor chip 900 of FIG. 9 includes a sensing element 902 and a sigma-delta circuit 904, but does not include an internal buffer.

The output of sigma-delta circuit 904 is a series of sensor values that are output at the sensor data rate. To convert these data samples into a set of samples at the servo rate, cancellation component 906 utilizes two interrupt routines 908 and 910. Interrupt routine 908 generates an interrupt once for each sensor sample from sigma-delta circuit 904. Interrupt routine 910 generates an interrupt once for each servo period.

The interrupts are provided to an interrupt processing component is 912, which initiates components in response to each interrupt. These components perform a series of processing steps, which are shown in the flow diagrams of FIGS. 10 and 11. Specifically, the processing steps that are initiated in response to the sensor interrupt of interrupt routine 908 are shown in FIG. 10 and the processing steps that are initiated in response to the servo interrupt of interrupt routine 910 are shown in FIG. 11.

Figure 10:
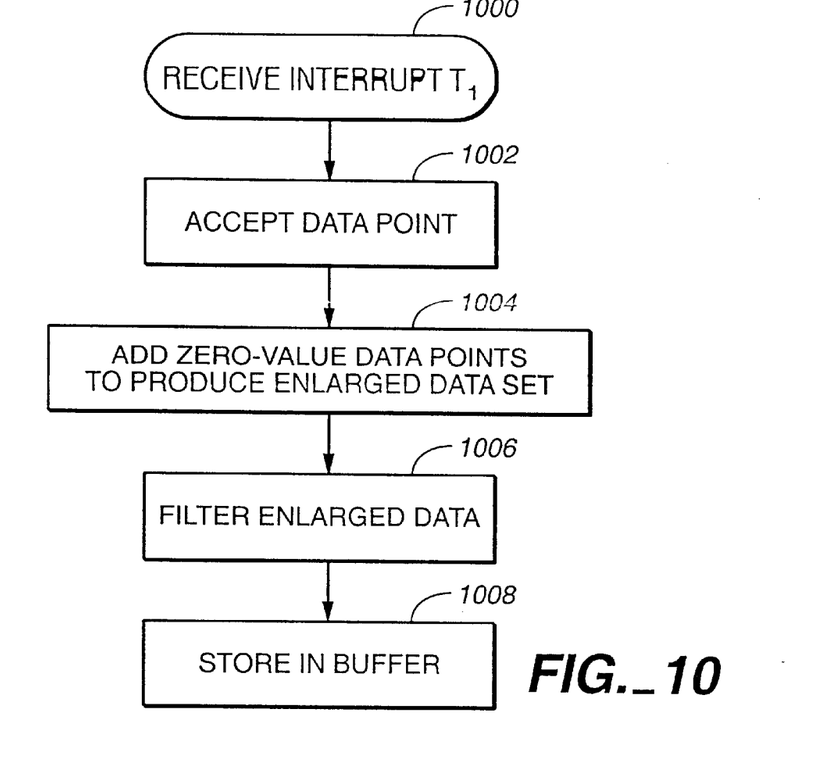
FIG. 10 is a flow diagram of a process for collecting, enlarging and filtering sensor data at the sensor rate.

In FIG. 10, after the sensor interrupt is received at step 1000, interrupt processing component 912 initiates a read component 914 of FIG. 9, which accepts the current sensor data sample from sensor 900. This is shown as step 1002 in FIG. 10. Read component 914 passes the current sensor data sample to an expander 916, which inserts L−1 zero-value samples before the data sample to produce an enlarged data set at step 1004 of FIG. 10. The enlarged data set is sent serially to a filter 918, which performs a low-pass filtering operation on the enlarged data set at step 1006. This results in a set of filtered data that is stored in a software buffer 920 at step 1008. Typically, the data is stored as an array, x[i], of sample values with the oldest sample at array location x[0].

Figure 11:
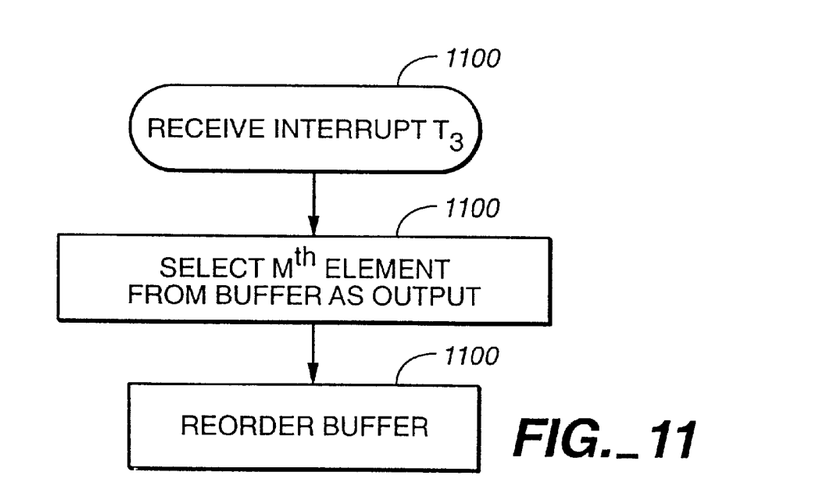
FIG. 11 is a flow diagram of a process for decimating filtered sensor data to produce sensor data at the servo data rate.

The filtered data remains in buffer 920 until interrupt processing component 912 receives a servo interrupt from interrupt routine 910 at step 1100 of FIG. 11. When that occurs, processing component 912 initiates decimator 922, which selects the Mth element from the buffer to form a sensor sample. This selection occurs at step 1102 in FIG. 11. Since the sensor sample is produced in response to an interrupt operating at the servo rate, the sensor samples produced by decimator 922 are produced at the servo rate. Decimator 922 then instructs buffer 920 to remove the first M samples from the array and to reorder the array so that the oldest sample in the array is once again at element x[0].

The sensor samples produced by decimator 922 are provided to a cancellation transform component 924, which generates cancellation values from the sensor samples. Because the sensor samples from decimator 922 are delivered at the servo rate, the cancellation values produced by transform component 924 are also at the servo rate. This makes it possible to combine the cancellation values with the servo control values at summing node 206 of FIG. 2.

In one embodiment of the invention, a sensor data rate of 51.2 kHz is adjusted to become compatible with a servo data rate of 21.4 kHz. Under this embodiment, the expander increased the data rate by a factor of 5 (L=5) while the decimator reduced this increased data rate by a factor of 12 (M=12). This resulted in a converted sensor sample rate of 21.3 kHz, which represents only an error of 0.2% relative to the desired servo rate of 21.4 kHz. Those skilled in the art will recognize that this error can be reduced by increasing the size of both L and M. However, increasing the size of these values also increases the size of the hardware and the software elements needed to implement the present invention.

In this embodiment, a fourth order digital elliptic filter was used, with a cutoff frequency of 2 kHz. The elliptical filter operated at a rate of 5 times the sensor data rate or 256 kHz.

Figure 12:
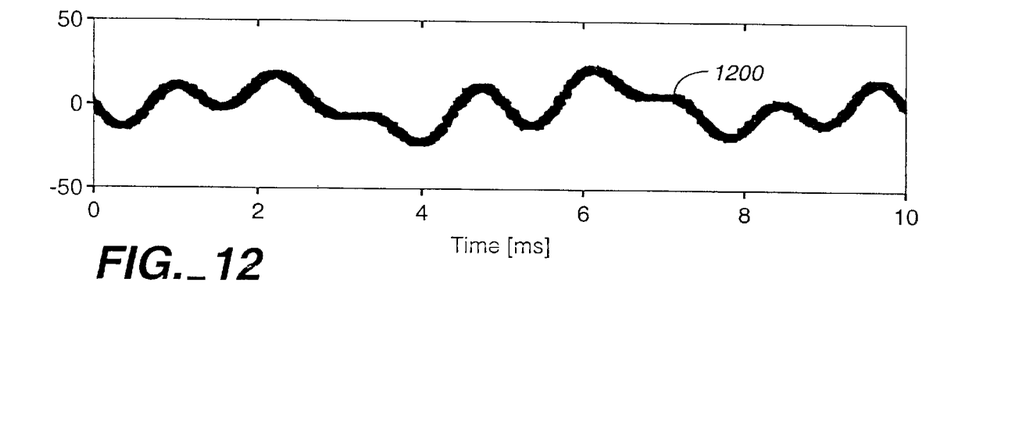
FIG. 12 is a graph of a noiseless sensor signal.
Figure 13:
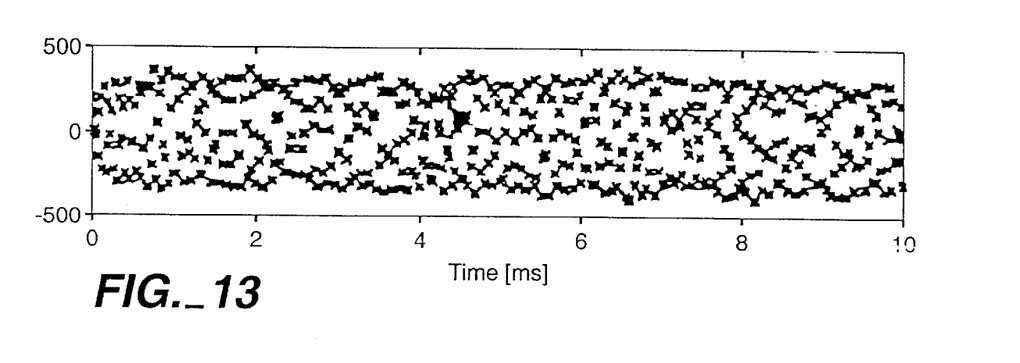
FIG. 13 is a graph of a noisy sensor signal.
Figure 14:
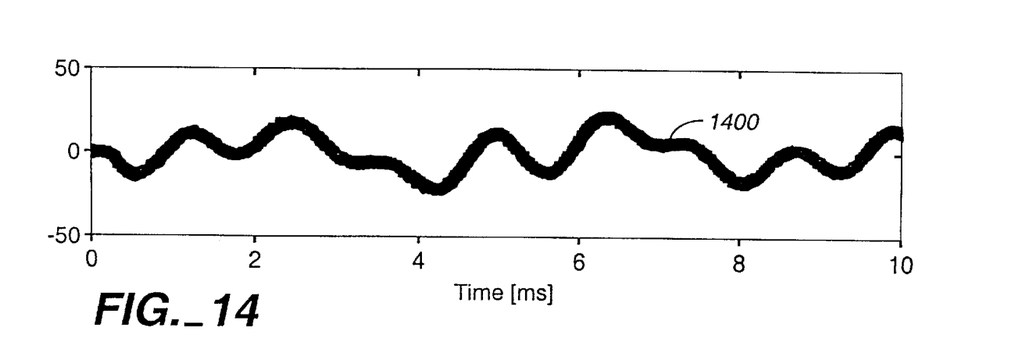
FIG. 14 is a graph of a sensor signal based on sensor data at the servo rate.

The performance of this embodiment can be seen in FIGS. 12, 13 and 14. FIG. 12 shows a trace of a noiseless sensor output 1200 consisting of frequency components between 200 Hz and 800 Hz. This output is corrupted by broadband additive noise resulting in the noisy signal of FIG. 13, which is output by the sigma-delta circuit in the sensor. After the expansion, filtering, and decimation of this embodiment of the invention, a converted sensor signal 1400 is produced as shown in FIG. 14. The converted sensor signal 1400 is delayed from the noiseless sensor output by approximately 200 µs.

In summary, a servo loop 202 is provided that includes an actuator 208 capable of positioning a head based on a control signal and a cancellation signal. A controller 204 generates the control signal based on position information received from the head at a servo data rate. A movement sensor 212 is capable of sensing movement of the disc drive and is capable of generating sensor data samples at a sensor data rate that is different from the servo data rate. A data enlarger 316 inserts additional data samples 600, 602, 604 between the sensor data samples 500, 502 to produce enlarged data. A filter 318 filters the enlarged data to produce filtered data that is decimated by a decimator 322. This results in decimated sensor data 802, 804, 806, 808 at the servo data rate. A cancellation component 324 then converts the decimated sensor data into a cancellation signal.

A sensor chip 300 is also provided that includes a sensing element 304 and a sigma-delta circuit 306 that cooperate to generate sensor samples at a sensor data rate. The sensor chip also includes a buffer 310 that is connected to the sigma-delta circuit 306 and that is capable of storing sensor samples from the sigma-delta circuit at the sensor data rate. The buffer is also able to provide stored sensor samples at a rate that is higher than the sensor data rate. In particular, the sensor chip is able to provide the stored sensor samples to an off-chip component at a rate set by the off-chip component.

A method of generating a modified control signal for controlling an actuator 208 in a disc drive is also provided. The method includes moving an actuator 208 and then reading servo information on the disc 106 to produce servo data at a servo data rate. The method also includes sensing the movement of the disc drive using a sensor 212 that produces sensor data at a sensor data rate that is different than the servo data rate. The sensor data is converted into converted sensor data at the servo rate and the converted sensor data is then used to generate a cancellation signal. A controller signal is generated based on the servo data, and the controller signal and the cancellation signal are combined to produce the modified control signal.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the cancellation signal may be inserted at different locations within the servo loop, and the buffer may be found outside of the sensor chip without departing from the scope and spirit of the present invention. Other modifications can also be made.

What is claimed is:

1. A sensor chip capable of being bonded to a surface to detect acceleration of the surface, the sensor chip comprising:
   a sensing element, capable of affecting an electrical signal based on movement of the surface;
   a sigma-delta circuit capable of interacting with the sensing element to generate sensor samples at a sensor data rate; and
   a buffer, coupled to the sigma-delta circuit and capable of storing sensor samples from the sigma-delta circuit at the sensor data rate and capable of providing stored sensor samples at a rate that is higher than the sensor data rate.

2. The sensor chip of claim 1 further comprising an output terminal capable of carrying stored sensor samples read from the buffer.

3. The sensor chip of claim 2 further comprising a read-enable terminal capable of being connected to an external component such that the external component can enable a reading operation to read stored sensor samples from the buffer by applying a signal to the read-enable terminal.

4. The sensor chip of claim 3 further comprising a read clock terminal capable of being connected to an external component such that the external component can control the rate at which stored sensor samples are read from the buffer.

5. The sensor chip of claim 1 wherein the sensing element is a micro-electromechanical system.

6. A method for providing acceleration data corresponding to the acceleration of an object, the method comprising steps of:
   (a) modifying an electrical signal within a sensor chip that is mounted to the object based on movement of the sensor chip;
   (b) generating sensor samples within the chip at a sensor data rate by applying the electrical signal to a sigma-delta circuit within the chip;
   (c) storing the sensor samples in a buffer on the chip at the sensor data rate; and
   (d) providing the stored sensor samples to a circuit external to the chip at a rate that is higher than the sensor data rate.

7. The method of claim 6 wherein providing step (d) comprises receiving a read enable signal from a circuit external to the chip before providing the stored sensor samples.

8. The method of claim 6 wherein providing step (d) comprises receiving a read clock signal from a circuit external to the chip and providing the stored sensor samples at a rate set by the read clock signal.

9. A sensor chip for sensing the movement of an object to which the sensor chip is bonded, the sensor chip comprising:
   a sensing element and sigma-delta circuit that together generate sensor samples indicative of movement of the object at a sensor data rate; and
   buffer means located on the sensor chip for storing the sensor samples at the sensor data rate for later retrieval at some rate that is higher than the sensor data rate.

* * * * *

UNITED STATES PATENT AND TRADEMARK OFFICE
CERTIFICATE OF CORRECTION

| | |
|---|---|
| PATENT NO. | : 6,311,140 B1 |
| DATED | : October 30, 2001 |
| INVENTOR(S) | : Morris et al. |

It is certified that error appears in the above-identified patent and that said Letters Patent is hereby corrected as shown below:

<u>Title page,</u>
Under Item [75] Inventors, John C. Morris; Dustin M. Cvancara, both of Minneapolis, MN (US) please replace with -- John C. Morris of Minneapolis and Dustin M. Cvancara of St. Paul, both of Minnesota (US) --

Signed and Sealed this

Nineteenth Day of March, 2002

Attest:

*Attesting Officer*

JAMES E. ROGAN
*Director of the United States Patent and Trademark Office*